United States Patent
Shiraishi et al.

(10) Patent No.: US 9,509,958 B2
(45) Date of Patent: Nov. 29, 2016

(54) IMAGE PICK-UP DEVICE AND POS SYSTEM INCLUDING THE SAME

(71) Applicant: TOSHIBA TEC KABUSHIKI KAISHA, Shinagawa-ku, Tokyo (JP)

(72) Inventors: Takashi Shiraishi, Kanagawa-ken (JP); Shinsuke Yajima, Shizuoka-ken (JP); Hidehiro Naito, Shizuoka-ken (JP); Tomonari Kakino, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 14/170,692

(22) Filed: Feb. 3, 2014

(65) Prior Publication Data
US 2014/0226017 A1    Aug. 14, 2014

(30) Foreign Application Priority Data
Feb. 12, 2013    (JP) .................................. 2013-024892

(51) Int. Cl.
*H04N 7/18*    (2006.01)
*G02B 27/00*    (2006.01)
*G06K 7/10*    (2006.01)

(52) U.S. Cl.
CPC ............ *H04N 7/18* (2013.01); *G02B 27/0025* (2013.01); *G06K 7/10831* (2013.01); *G06K 2007/10485* (2013.01)

(58) Field of Classification Search
CPC ........... G06F 2203/04103; G06F 2203/04111; G06F 3/044; H03K 17/962; H03K 2017/9615; H03K 2217/96075; H03K 2217/960755; G02B 27/0025; G06K 2007/10485; G06K 7/10831; H04N 7/18

USPC .......................................................... 348/150
See application file for complete search history.

(56) References Cited

U.S. PATENT DOCUMENTS 5,249,045 A * 9/1993 Lemelson ................. B07C 5/10
                                                                 348/92
5,351,078 A * 9/1994 Lemelson ............ H04N 5/7822
                                                                 348/130
(Continued)

FOREIGN PATENT DOCUMENTS

JP    60-187972    12/1985
JP    11-195082    7/1999
(Continued)

OTHER PUBLICATIONS

Office Action of Notification of Reason(s) for Refusal for Japanese Patent Application No. 2013-024892 dated Apr. 7, 2015, 3 pages.

*Primary Examiner* — Shan Elahi
(74) *Attorney, Agent, or Firm* — Amin, Turocy & Watson LLP

(57) ABSTRACT

An image pick-up device which photographs an object to generate an image signal representing the object, including: a housing including an opening; a transparent plate which covers the opening; an image detector arranged in the housing; an optical lens forming an image of the object on the image detector through the transparent plate; a lighting device arranged in the housing and placed both in an inner area in which an imaging area outside the housing is folded into the housing with reference to one surface of the transparent plate, and in an outer area of the imaging area; and an optical-path modifying element which causes an optical path of the light to be refracted such that the light is emitted from a virtual image of the lighting device, the virtual image being placed outside the inner area.

10 Claims, 4 Drawing Sheets

(56) References Cited

U.S. PATENT DOCUMENTS

| | | | | |
|---|---|---|---|---|
| 5,449,892 A * | 9/1995 | Yamada | G06K 7/10594 | 235/462.35 |
| 5,506,912 A * | 4/1996 | Nagasaki | A61B 1/00188 | 348/65 |
| 7,416,118 B2 * | 8/2008 | Throckmorton | G06Q 30/06 | 186/59 |
| 7,561,182 B2 * | 7/2009 | VanCleave | H04N 7/18 | 235/380 |
| 2003/0047614 A1 * | 3/2003 | Dvorkis | G06K 7/10594 | 235/462.37 |
| 2004/0189819 A1 * | 9/2004 | Saito | H04N 5/232 | 348/222.1 |
| 2006/0243798 A1 * | 11/2006 | Kundu | G06Q 20/00 | 235/383 |
| 2007/0057049 A9 * | 3/2007 | Kundu | G06Q 20/00 | 235/383 |
| 2007/0145117 A1 * | 6/2007 | Throckmorton | G06Q 30/06 | 235/379 |
| 2007/0272734 A1 * | 11/2007 | Lipton | H04N 7/18 | 235/375 |
| 2008/0251575 A1 * | 10/2008 | Bowling | G06F 17/30793 | 235/375 |
| 2009/0153681 A1 * | 6/2009 | Yang | H04N 5/23212 | 348/208.12 |
| 2010/0250359 A1 * | 9/2010 | Gillenson | G06Q 30/0222 | 705/14.25 |
| 2011/0080487 A1 * | 4/2011 | Venkataraman | H04N 5/2253 | 348/218.1 |
| 2012/0022924 A1 * | 1/2012 | Runnels | G06F 3/011 | 705/14.4 |
| 2012/0044571 A1 * | 2/2012 | Mukawa | G02B 27/0103 | 359/630 |
| 2012/0127314 A1 * | 5/2012 | Clements | G08B 13/246 | 348/150 |
| 2013/0126607 A1 * | 5/2013 | Behjat | G06Q 20/3274 | 235/380 |
| 2013/0127980 A1 * | 5/2013 | Haddick | G06F 3/013 | 348/14.08 |
| 2014/0293091 A1 * | 10/2014 | Rhoads | G01J 3/513 | 348/234 |

FOREIGN PATENT DOCUMENTS

| | | |
|---|---|---|
| JP | 2007-057296 | 3/2007 |
| JP | 2008-027062 | 2/2008 |
| JP | 2012-216138 | 11/2012 |

* cited by examiner

IMAGE PICK-UP DEVICE AND POS SYSTEM INCLUDING THE SAME

CROSS-REFERENCE TO RELATED APPLICATION

This application is based upon and claims the benefit of priority from the prior Japanese Patent Application No. 2013-024892 filed on Feb. 12, 2013, the entire contents of which are incorporated herein by reference.

FIELD

Embodiments described herein relate generally to an image pick-up device and a POS system including the image pick-up device.

BACKGROUND

A conventional image reader electrically communicated with a POS terminal, i.e., Point of Sales terminal, optically captures an image showing a code symbol on a label attached to a commodity or an object image partly and/or totally showing a commodity through an opening provided to a housing of the image reader. The image reader decodes the captured image to generate code information relating to the code symbol, e.g., a commodity code, or extracts feature amount from the captured object image. The code symbol image or the object image is captured by an image detector, e.g., CCD sensor (Charge Coupled Device sensor), provided in the image reader.

The opening in the image reader is covered with a transparent flat plate having permeability, e.g., glass, resin and so on, to prevent foreign matters or dust from being stuck to the image detector.

The image reader includes a lighting device to illuminate an image reading area in which a code symbol on a label or an object is brought to capture the image thereof. An imaging area is allocated for the image detector to receive light reflected by the code symbol or the object. A part of the imaging area corresponds to the image reading (capturing) area. The lighting device includes an LED (Light Emitting Diode). A part of Light, emitted by the lighting device, which is reflected by the transparent plate, becomes a stray light. To prevent the stray light from arriving at the image detector, the lighting device is placed outside of an equivalent imaging area to illuminate the imaging area allocated to the image detector.

DESCRIPTION OF THE DRAWINGS

This and other aspects and advantages of this embodiment will become apparent and more readily appreciated from the following detailed description of the embodiments taken in conjunction with the accompanying drawings wherein.

DETAILED DESCRIPTION

Figure 1:
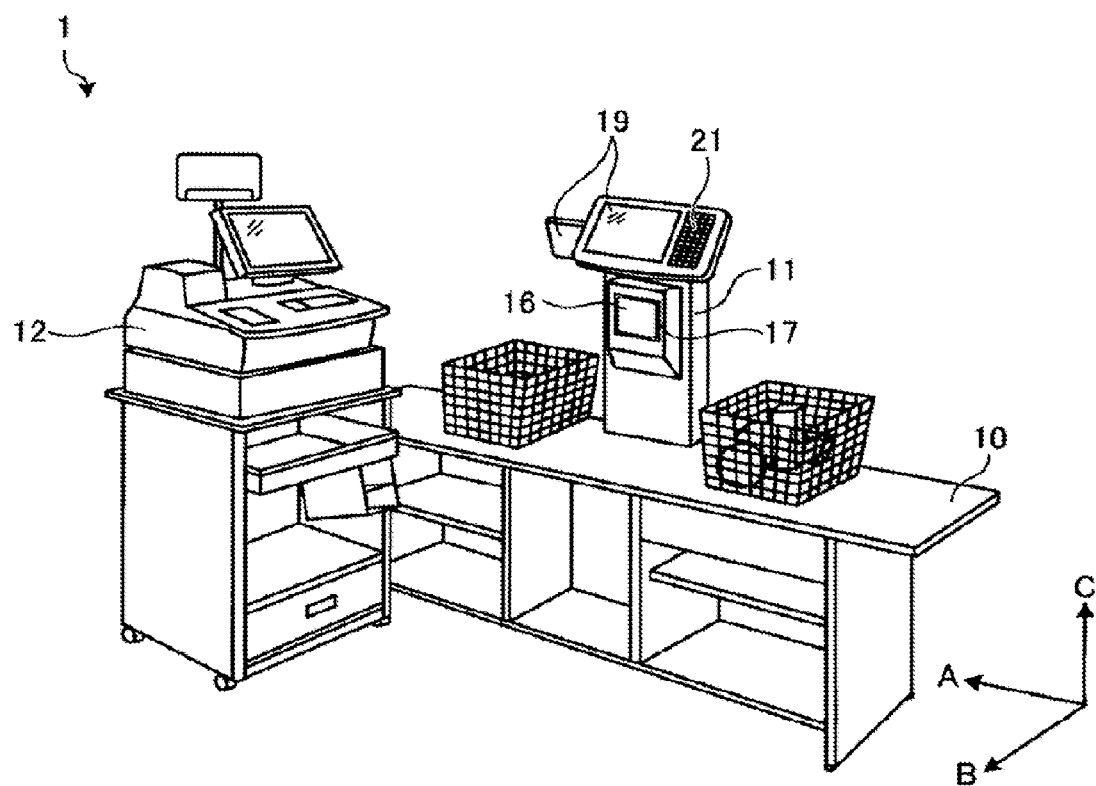
FIG. 1 is a perspective view illustrating an entire POS system including an image reader according to a present embodiment.

According to an embodiment, an image pick-up device, which photographs an object to generate an image signal representing the object, comprises: a housing including an opening to pass light therethrough; a transparent plate which covers the opening and has a first surface facing the object and a second surface opposite to the first surface; an image detector arranged in the housing to generate the image signal; an optical lens forming an image of the object on the image detector through the transparent plate when the object is positioned in an imaging area from which light reaches the image detector through the optical lens; a lighting device, configured to emit light, which is arranged in the housing to illuminate the object and placed both in an inner area in which the imaging area outside the housing is folded into the housing with reference to the first surface, and in an outer area of the imaging area in the housing; and an optical-path modifying element which causes an optical path of the light emitted by the lighting device to be refracted such that the light is emitted from a virtual image of the lighting device, the virtual image being placed outside the inner area.

Embodiment of the present invention will now be described in more detail with reference to the accompanying drawings. However, the same numerals are applied to the similar elements in the drawings, and therefore, the detailed descriptions thereof are not repeated.

FIG. 1 is a perspective view illustrating an entire POS system 1 including an image reading apparatus 11 according to a present embodiment. The arrow A in the FIGURE is referred to a width direction, i.e., right and left direction, in the image reader 11. The arrow B is referred to a back and forth direction in the image reader 11. The arrow C is referred to a perpendicular direction in the image reader 11.

The POS system 1 in FIG. 1 includes the image reading apparatus 11 serving as a vertical type image reader and a POS terminal 12 which performs a sales registration processing in accordance with an image captured by the image reading apparatus 11. The image reading apparatus 11 is upright-installed in the approximate center of a checkout counter 10 on which a shopping basket is put. The POS terminal 12 is placed at one of the edges of the checkout counter 10. The image reading apparatus 11 and POS terminal 12 are electrically communicated with each other through a well known transmission path not shown in FIG. 1. Combining the image reading apparatus 11 and POS terminal 12 makes a POS terminal section in the POS system 1.

The image reading apparatus 11 includes an image pick-up device 17, key board 21, two displays 19, and so on. The image pick-up device 17 includes an opening 16 covered with a transparent plate facing an operator. The image pick-up device 17 optically photographs a code symbol, e.g., barcode, two-dimensional code, on a label or a part and/or entire of a commodity through the opening 16 to generate an image signal representing the code symbol or the commodity photographed. On the keyboard 21, a well known various keys are arranged. The keyboard 21 also includes operation keys to register a commodity the registration of which can not be executed. There may be a case that the commodity has no code symbol or the commodity is not properly recognized. The displays 19 for operator and for customer respectively display the name and price of the registered commodity, and so on, to the operator and the customer in accordance with a sales registration processing executed by the POS terminal 12.

Figure 2:
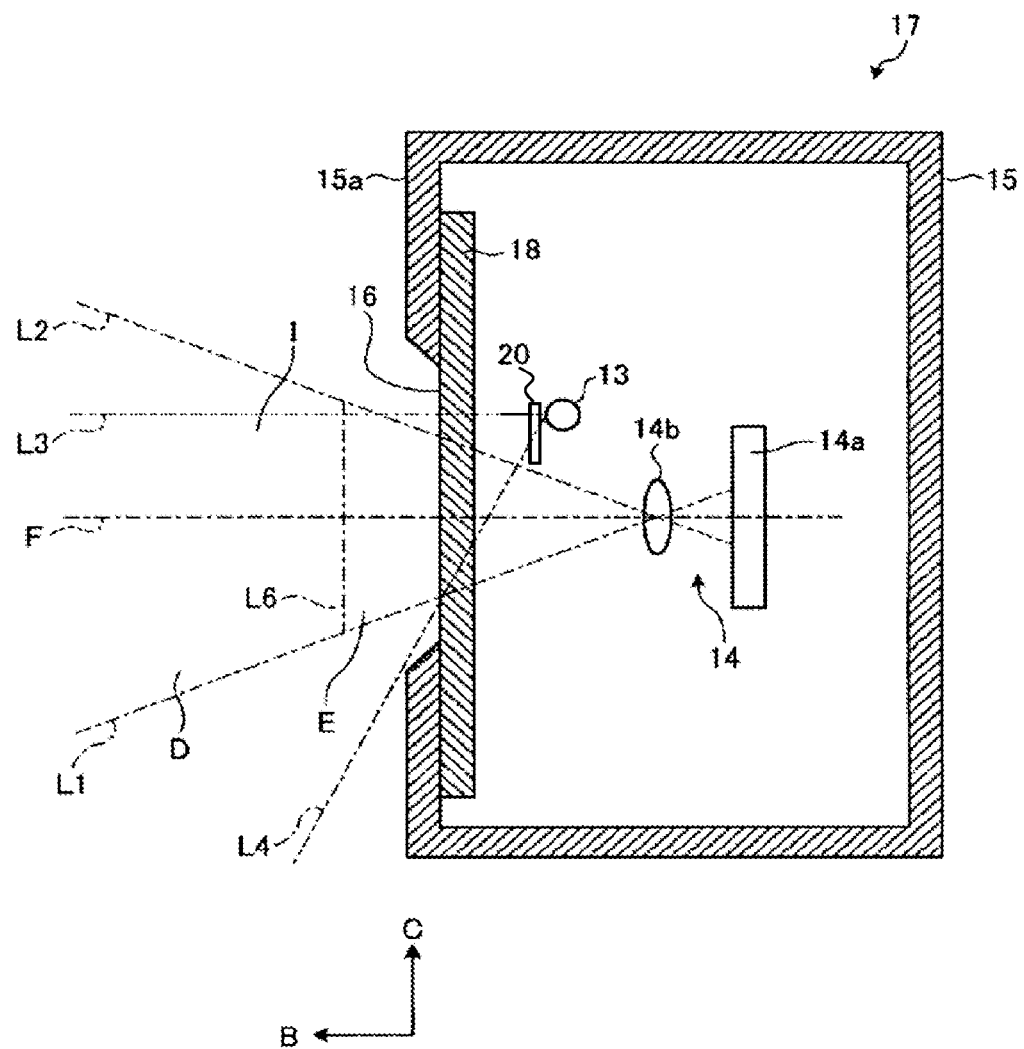
FIG. 2 is a sectional view illustrating an image capturing device contained in the image reader.

The structure of the image pick-up device 17 will now be described in detail. FIG. 2 is a cross-sectional view showing an outline structure of the image pick-up device 17 provided in the image reading apparatus 11.

In FIG. 2, the image pick-up device 17 includes a housing 15 to which an opening 16 is provided to pass light therethrough, and captures an image of the code symbol or the commodity (hereinafter referred to as an "object"). The image pick-up device 17 has an image pick-up section 14 comprising an image detector 14a, an optical lens 14b, i.e., photographing lens, and a lighting device 13 which irradiates the object (code symbol or commodity) with light therefrom. An imaging area D in which the object is brought is invisibly formed in front of the opening 16. If the object is held within the imaging area D, for example, the light reflected by the object enters the image pick-up section 14. In the image pick-up section 14, the light passing through the optical lens 14b is received by the image detector 14a and thus the image detector captures image of the object. The imaging area D in FIG. 2 is formed within a range bordered by dashed lines L1 and L2.

The housing 15 is shaped approximately in cubic, e.g., a box-shape. The opening 16 is formed at a front wall 15a of the housing 15. The front wall of the housing 15 faces an operator standing in front of the housing 15. The opening 16 is shaped approximately rectangular in front view. The housing 15 is referred to an enclosure, e.g., the cuboidal case, or a case of the image reading apparatus 11 instead of the enclosure.

The opening 16 is covered with a flat transparent plate 18 to prevent foreign matters or dust from entering the image pick-up section 14. The transparent plate 18 is made of a glass, resin, and so on. The transparent plate 18 is supported by the housing 15. Specifically the transparent plate 18 is affixed to the housing 15 with an adhesion applied between the perimeter of the opening 16 in the inside of the housing 15 and the transparent plate 18.

The lighting device 13 radiates an illumination light I toward the imaging area D invisibly located in front of the image pick-up section 14 through the transparent plate 18 to illuminate an object brought into the imaging area D. The illumination light I emitted by the lighting device 13 is indicated with a region defined by dashed lines L3 and L4 as shown in FIG. 2. In the FIGURE, an optical-path modifying element 20 is illustrated. The optical-path modifying element 20 refracts the optical-path of the illumination light I emitted by the lighting device 13 to modify the direction of the optical-path. Detail of the optical-path modifying element 20 will be described later.

The lighting device 13 includes an LED (Light Emitting Diode) acting as a light source. A single LED or a plurality of LEDs may be available as the lighting device 13. The lighting device 13 is placed at an upper part of the image pick-up section 14 so that the lighting device 13 illuminates the imaging area D from a position higher than the image detector 14a in a diagonal-downward direction. The layout of the lighting device 13 prevents the illumination light I from directly entering eyes of an operator who operates the image reading apparatus 11.

As described above, the image pick-up section 14 includes the optical lens 14b and the image detector 14a. The image detector 14a may be, for example, a CCD image sensor (Charge Coupled device), a CMOS image sensor (Complementary Metal Oxide Semiconductor) and so on. In FIG. 2 an optical axis F of the optical lens 14b in the image pick-up section 14 extends in a right angle to the image pick-up device 17 and passes through the opening 16.

The image pick-up section 14 photographs the object brought in an image reading area E invisibly formed outside the opening 16 of the housing 15. In FIG. 2 the image reading area E is diagrammatically indicated as an area which is defined by dashed line L6 and the outside surface of the transparent plate 18 within the imaging area D.

The image reading area E is described in detail. The image reading area E, i.e., an area in which the image detector 14a of the image pick-up section 14 is capable of photographing the object, is formed according to a characteristic of the optical lens 14b. The optical lens 14b in the present embodiment is formed of a fixed focal lens. An object surface, i.e., the reflected light from the object surface being in right focus on the image detector 14a, of the optical lens 14b is apart from a tip of the lens by a predetermined distance. Placing the object at the object surface enables the image detector 14a to capture an image having highest resolution and sharpness. The nearer or farther the object moves from the object surface with reference to the image detector 14a, the blurrier the image becomes, resulting in lowering the resolution of the image. For example, assuming that a barcode is decoded, the decoder requires measuring respective correct bar-widths constituting a barcode having different color bars, e.g., black and white, based on an image data of the object sensed by the image detector 14a. If the image sensed by the image detector 14a is out of focus, the decoder may not measure the correct bar-width, failing to encode the barcode. Consequently a part of the imaging area D in which the image detector 14a can capture an image having a higher resolution than a predetermined value forms the image reading area E, in which an image-processing-circuit provided to the decoder (not shown in the FIGURES) can extract a code symbol from the image data.

In other words, the image pick-up section 14 is arranged at a position in the housing 15 where the image pick-up section 14 receives a light, reflected from the object brought within the image reading area E in front of the opening 16, which enters the housing through the opening 16. The image pick-up section 14 captures an image of the object by focusing the light on the image detector 14a through the optical lens 14b, and outputs an image data relating to the image captured.

Arrangement of the lighting device 13 is now described in detail.

Figure 3:
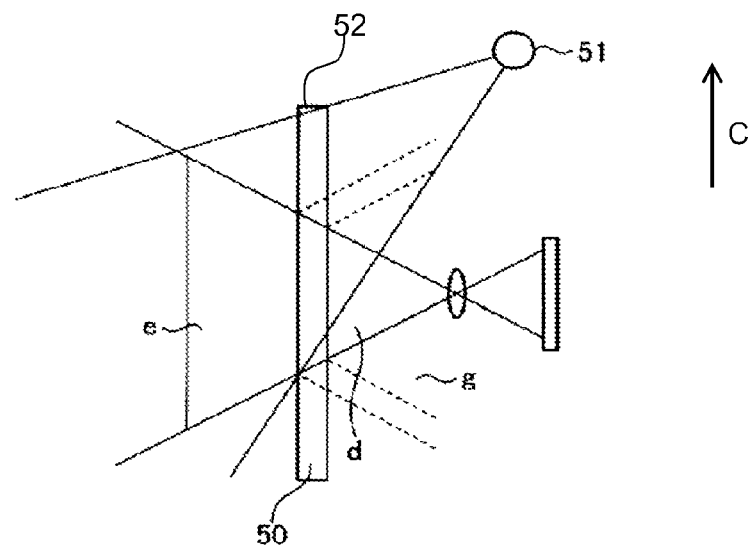
FIG. 3 is a schematic illustration showing layout of a conventional lighting device.

As shown in FIG. 3, arrangements of a transparent plate 50 which prevents foreign matters from entering the image pick-up device, the image pick-up section 14, and the lighting device 51 in the conventional image pick-up device is described. To prevent a stray light in the conventional image pick-up device, the lighting device 51 is arranged outside an area g (hereinafter referred to as "an equivalent imaging area g") which is wider than one of a first area and a second area. The first area is defined by optical paths which are directed by folding an image area d of the image pick-up section 14 with reference to a light emitting surface of the transparent plate 50, functioning to reflect light from the lighting device 51. The second area is defined by optical paths which are directed by folding an image area d of the image pick-up section 14 with reference to a light incident surface of the transparent plate 50, functioning to reflect light from the lighting device 51.

The above-described conventional image pick-up device poses a problem that the image pick-up device becomes large in size, because the lighting device 51 is placed outside the equivalent imaging area g to illuminate an object brought in the imaging area of the image detector.

Figure 4:
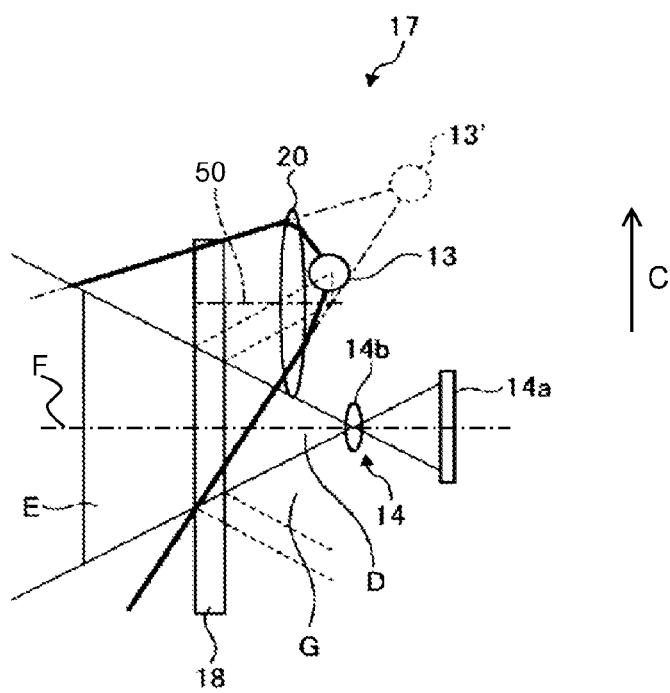
FIG. 4 is a schematic illustration showing layout of a lighting device in the present embodiment.

FIG. 4 is a schematic diagram illustrating arrangement of the lighting device 13 according to the present embodiment. As shown in FIG. 4, the image pick-up device 17 includes a lighting device 13 placed both outside the imaging area D and inside the equivalent imaging area G, to miniaturize the image pick-up device 17.

If the lighting device 13 is arranged inside the equivalent imaging area G to illuminate a target object in FIG. 4, a light originated from the lighting device 13 is reflected by an incident surface and/or an outgoing surface of the transparent plate 50 and a part of the light, i.e., a stray light, reaches the image detector 14a through an entrance pupil of the optical lens 14b arranged in the image pick-up section 14. The stray light is overlapped with a normal light reflected by a commodity (target object), and reaches the image detector 14a. Therefore, the stray light may pose a problem that a performance of image reading is degraded.

In the present embodiment, the image pick-up device 17 contained in the image reading apparatus 11 has an optical path-modifying element 20, as an optical element, to refract an optical path of light ray which is at least a part of the illumination light I emitted from the lighting device 13. The optical path-modifying element 20 directs the optical path of the light ray of image detector side, toward a direction apart from the image detector 14a due to the refraction. As a result, the optical path-modifying element 20 causes a virtual image 13' of the lighting device 13 actually disposed inside the equivalent imaging area G to be disposed outside the equivalent imaging area G. The optical path-modifying element 20 may be an optical lens, a mirror for illumination, a prism, and so on.

The schematic diagram in FIG. 4 also shows an exemplary arrangement of the lighting device 13 and the optical-path modifying element 20, e.g., an optical lens. The lighting device 13 serving as a light source is arranged at both outside the imaging area D and inside the equivalent imaging area G. In addition, an emitting point of the light source, i.e., LED, is shifted with reference to an optical axis of the optical-path modifying element 20 in a direction that the light source is apart from an axis 50 of the optical lens 14b for focusing the object. Namely, the optical axes 50 of the optical-path modifying element 20 and the optical axes F of the optical lens 14b are arranged in parallel, and the lighting device 13 is arranged such that it is shifted in the direction C from the axis 50 of the optical-path modifying element 20 within the equivalent imaging area G. The arrangement of the lighting device 13 and the optical-path modifying element 20 causes the light ray emitted from the lighting device 13 to be refracted by the optical-path modifying element 20 and to pass on the course such that the light ray I comes from the virtual image 13' of the lighting device 13 as if it is arranged outside the equivalent imaging area G. As a result, this structure can prevent a stray light originated from the lighting device 13 from reaching the image detector 14a.

Figure 5:
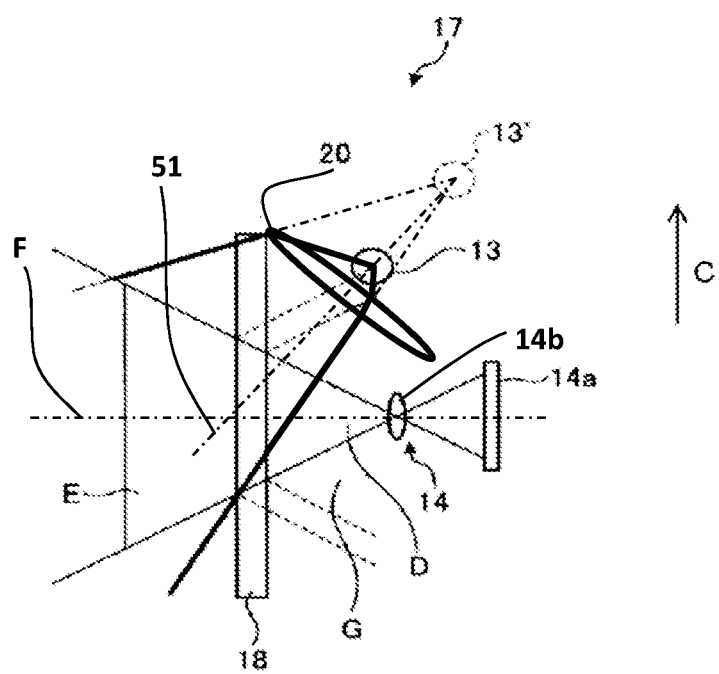
FIG. 5 is a schematic illustration showing layout of a lighting device in the alternative embodiment.

Referring to FIG. 5, an alternative optical-path modifying element 20, e.g., an optical lens 20, will be described. The optical lens 20 may be arranged such that an optical axis 51 thereof is inclined toward an intersection of the optical axis F of the optical lens 14b and the transparent plate 18 with reference to the border of the equivalent imaging area G. The arrangement of the optical lens 20 allows the light source, e.g., LED, to be set on the optical axis of optical lens 20. The slant arrangement of the optical-path modifying element 20 also results in the same effect as the parallel arrangement mentioned above.

As a result, the image pick-up device 17 and the image reading apparatus 11 including the image pick-up device 17 can be miniaturized, because the lighting device 13 is disposed inside the equivalent imaging area G.

The POS system 1 formed of a combination of the image reading apparatus 11 having the image pick-up device 17 and the POS terminal 12 is described in the aforementioned embodiments. Application of the image reading apparatus 11 is not limited to the POS system. The image reading apparatus 11 can be installed in an integrated POS system, as a single POS system, including functions of the image reading apparatus 11 and the POS terminal 12. A self check-out system is exemplified in the integrated POS system set in a retail store, e.g., supermarket, grocery store, and so on, and operated by a customer.

The several embodiments of the present invention are explained above. However, these embodiments are presented as examples and are not intended to limit the scope of the invention. These new embodiments can be carried out in other various forms. Various kinds of omission, replacement, and change can be performed without departing from the spirit of the invention. These embodiments and modifications thereof are included in the scope and the spirit of the invention and include in the inventions described in claims and a scope of equivalents of the inventions.

What is claimed is:

1. An image pick-up device which photographs an object to generate an image signal representing the object, comprising:
   a housing including an opening to pass light therethrough;
   a transparent plate which covers the opening and has a first surface facing the object and a second surface opposite to the first surface;
   an image detector arranged in the housing to generate the image signal;
   an optical lens forming an image of the object on the image detector through the transparent plate when the object is positioned in an imaging area from which light reaches the image detector through the optical lens;
   a lighting device configured to emit light, which is arranged in the housing to illuminate the object, wherein the lighting device illuminates both of an inner area in which the imaging area outside the housing is folded into the housing with reference to the first surface, and an outer area of the imaging area; and
   an optical-path modifying element which causes an optical path of the light emitted by the lighting device to be refracted such that the light is emitted from a virtual image of the lighting device, the virtual image being placed outside the inner area.

2. The image pick-up device according to claim 1, wherein the optical-path modifying element is an optical element having an optical axis and an emitting point of the lighting device is shifted with reference to the optical axis of the optical element in a direction that the emitting point is apart from the optical axis of the optical lens.

3. The image pick-up device according to claim 1, wherein the optical-path modifying element is an optical element having an optical axis and the optical axis of the optical element is inclined to an approximate center of the transparent plate with reference to the border of the inner area.

4. The image pick-up device according to claim 1, wherein the optical-path modifying element refracts the optical path of a part of the light emitted by the lighting device to be directed toward a direction apart from the image detector, wherein the optical path refracted extends near the image detector.

5. The image pick-up device according to claim 1, wherein the lighting device is arranged such that the lighting device illuminates the imaging area from a position higher than the image detector in a diagonal-downward direction.

6. A POS system having an image pick-up device which photographs an object to generate an image signal representing the object, and a POS terminal which executes a sales registration processing in accordance with the image signal, the image pick-up device comprising:
   a housing including an opening to pass light therethrough;
   a transparent plate which covers the opening and has a first surface facing the object and a second surface opposite to the first surface;
   an image detector arranged in the housing to generate the image signal;
   an optical lens forming an image of the object on the image detector through the transparent plate when the object is positioned in an imaging area from which light reaches the image detector through the optical lens;
   a lighting device configured to emit light, which is arranged in the housing to illuminate the object, wherein the lighting device illuminates both of an inner area in which the imaging area outside the housing is folded into the housing with reference to the first surface, and an outer area of the imaging area; and
   an optical-path modifying element which causes an optical path of the light emitted by the lighting device to be refracted such that the light is emitted from a virtual image of the lighting device, the virtual image being located outside the inner area.

7. The POS system according to claim 6, wherein the optical-path modifying element is an optical element having an optical axis and an emitting point of the lighting device is shifted with reference to the optical axis of the optical element in a direction that the emitting point is apart from the optical axis of the optical lens.

8. The POS system according to claim 6, wherein the optical-path modifying element is an optical element having an optical axis and the optical axis of the optical element is inclined to an approximate center of the transparent plate with reference to the border of the inner area.

9. The POS system according to claim 6, wherein the optical-path modifying element refracts the optical path of a part of the light emitted by the lighting device to be directed apart from the image detector, wherein the optical path extends near the image detector.

10. The POS system according to claim 6, wherein the lighting device is arranged such that the lighting device illuminates the imaging area from a position higher than the image detector in a diagonal-downward direction.

* * * * *